United States Patent
Mao et al.

(10) Patent No.: US 10,834,405 B2
(45) Date of Patent: Nov. 10, 2020

(54) BIT RATE ALLOCATION METHOD AND DEVICE, AND STORAGE MEDIUM

(71) Applicant: TENCENT TECHNOLOGY (SHENZHEN) COMPANY LIMITED, Shenzhen (CN)

(72) Inventors: Xunan Mao, Shenzhen (CN); Chenchen Gu, Shenzhen (CN); Yongfang Shi, Shenzhen (CN); Anlin Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/362,415

(22) Filed: Mar. 22, 2019

(65) Prior Publication Data
US 2019/0222849 A1    Jul. 18, 2019

Related U.S. Application Data

(63) Continuation of application No. PCT/CN2018/077983, filed on Mar. 5, 2018.

(30) Foreign Application Priority Data

Mar. 7, 2017  (CN) .......................... 2017 1 0139993

(51) Int. Cl.
*H04N 19/149*     (2014.01)
*H04N 19/115*     (2014.01)
(Continued)

(52) U.S. Cl.
CPC ......... *H04N 19/149* (2014.11); *H04N 19/105* (2014.11); *H04N 19/115* (2014.11);
(Continued)

(58) Field of Classification Search
USPC .................................................. 386/326–342
See application file for complete search history.

(56) References Cited

U.S. PATENT DOCUMENTS

| 2004/0042548 A1* | 3/2004 | Yu ........................ H04N 19/172 375/240.03 |
| 2008/0187042 A1* | 8/2008 | Jasinschi ............. H04N 19/176 375/240.03 |

(Continued)

FOREIGN PATENT DOCUMENTS

| CN | 101198042 A | 6/2008 |
| CN | 101572806 A | 11/2009 |

(Continued)

OTHER PUBLICATIONS

The World Intellectual Property Organization (WIPO) International Search Report for PCT/CN2018/077983 dated May 25, 2018 5 Pages (including translation).
(Continued)

*Primary Examiner* — Hung Q Dang
(74) *Attorney, Agent, or Firm* — Anova Law Group, PLLC

(57) ABSTRACT

A bit rate allocation method is provided for a bit rate allocation device. The method includes obtaining an intra prediction frame (I-frame) of a to-be-encoded video, and obtaining a bit-rate characteristic parameters associated with the I-frame. The bit-rate characteristic parameters include a number of video frames in a group-of-picture (GOP) in which the I-frame is located, a pixel number of the I-frame, and a proportion of an inter prediction macroblock in a historical inter prediction frame (P-frame) before the I-frame. The method also includes determining an allocated bit rate of the I-frame according to each bit-rate characteristic parameter.

19 Claims, 5 Drawing Sheets

Obtain a current intra prediction frame (I-frame) of an encoded video, and obtain a bit rate characteristic parameter associated with the current I-frame — S101

Determine an allocated bit rate of the current I-frame according to the bit rate characteristic parameter — S102

(51) Int. Cl.
*H04N 19/172* (2014.01)
*H04N 19/137* (2014.01)
*H04N 19/159* (2014.01)
*H04N 19/176* (2014.01)
*H04N 19/184* (2014.01)
*H04N 19/177* (2014.01)
*H04N 19/105* (2014.01)
*H04N 19/134* (2014.01)

(52) U.S. Cl.
CPC ......... *H04N 19/137* (2014.11); *H04N 19/159* (2014.11); *H04N 19/172* (2014.11); *H04N 19/176* (2014.11); *H04N 19/177* (2014.11); *H04N 19/184* (2014.11)

(56) References Cited

U.S. PATENT DOCUMENTS

| | | | |
|---|---|---|---|
| 2010/0111163 A1 | 5/2010 | Yang et al. | |
| 2011/0142125 A1* | 6/2011 | Tripathi | H04N 19/149 375/240.03 |
| 2012/0002721 A1* | 1/2012 | Berbecel | H04N 21/2365 375/240.03 |
| 2013/0279563 A1* | 10/2013 | Li | H04N 19/40 375/240.02 |
| 2015/0319437 A1* | 11/2015 | Zhang | H04N 19/176 375/240.03 |
| 2015/0349915 A1 | 12/2015 | Eum | |
| 2017/0013262 A1* | 1/2017 | Jun | H04N 19/146 |

FOREIGN PATENT DOCUMENTS

| | | |
|---|---|---|
| CN | 101754003 A | 6/2010 |
| CN | 101795415 A | 8/2010 |
| CN | 101854524 A | 10/2010 |
| CN | 103957410 A | 7/2014 |
| CN | 107027030 A | 8/2017 |
| KR | 20100104864 A | 9/2010 |

OTHER PUBLICATIONS

The State Intellectual Property Office of the People's Republic of China (SIPO) Office Action 1 for 201710139993.4 dated May 21, 2018 7 Pages (including translation).
Wei Li et al., "H.265/HEVC frame-level bitrate allocation algorithm considering video content", "Journal of communication", vol. 36, No. 9, Sep. 30, 2015, the entire passage. 6 Pages.

* cited by examiner

US 10,834,405 B2

BIT RATE ALLOCATION METHOD AND DEVICE, AND STORAGE MEDIUM

RELATED APPLICATIONS

This application is a continuation application of PCT Patent Application No. PCT/CN2018/077983, filed on Mar. 5, 2018, which claims priority to Chinese Patent Application No. 201710139993.4, filed with the Chinese Patent Office on Mar. 7, 2017, and entitled "BIT RATE ALLOCATION METHOD AND DEVICE", content of all of which is incorporated herein by reference in its entirety.

FIELD OF THE TECHNOLOGY

The present disclosure relates to the field of electronic technologies and, in particular, to a bit rate allocation method and device, and a storage medium.

BACKGROUND OF THE DISCLOSURE

With the continuous development and improvement of electronic science and technologies, terminals such as mobile phones and tablet computers have become an indispensable part of people's lives. With these terminals, people not only can entertain themselves (for example, watching videos), but also perform operations, such as storage, transmission, and exchange, on video files.

SUMMARY

Embodiments of the present invention provide a bit rate allocation method and device, and a storage medium, to more precisely allocate a bit rate to an I-frame, and ensure video file quality.

One aspect of the present disclosure includes a bit rate allocation method provided for a bit rate allocation device. The method includes obtaining an intra prediction frame (I-frame) of a to-be-encoded video, and obtaining a bit-rate characteristic parameters associated with the I-frame. The bit-rate characteristic parameters include a number of video frames in a group-of-picture (GOP) in which the I-frame is located, a pixel number of the I-frame, and a proportion of an inter prediction macroblock in a historical inter prediction frame (P-frame) before the I-frame. The method also includes determining an allocated bit rate of the I-frame according to each bit-rate characteristic parameter.

Another aspect of the present disclosure includes a non-transitory computer-readable storage medium storing computer program instructions. The computer program instructions are executable by at least one processor to perform: obtaining an intra prediction frame (I-frame) of a to-be-encoded video; obtaining a bit-rate characteristic parameters associated with the I-frame, the bit-rate characteristic parameters including a number of video frames in a group-of-picture (GOP) in which the I-frame is located, a pixel number of the I-frame, and a proportion of an inter prediction macroblock in a historical inter prediction frame (P-frame) before the I-frame; and determining an allocated bit rate of the I-frame according to each bit-rate characteristic parameter.

Another aspect of the present disclosure includes a bit rate allocation device. The bit rate allocation device includes a non-volatile memory storing machine-readable instructions, and a processor coupled to the non-volatile memory. When executing the machine-readable instructions, the processor is configured for: obtaining an intra prediction frame (I-frame) of a to-be-encoded video; obtaining a bit-rate characteristic parameters associated with the I-frame, the bit-rate characteristic parameters including a number of video frames in a group-of-picture (GOP) in which the I-frame is located, a pixel number of the I-frame, and a proportion of an inter prediction macroblock in a historical inter prediction frame (P-frame) before the I-frame; and determining an allocated bit rate of the I-frame according to each bit-rate characteristic parameter.

Other aspects of the present disclosure can be understood by those skilled in the art in light of the description, the claims, and the drawings of the present disclosure.

BRIEF DESCRIPTION OF THE DRAWINGS

To describe the technical solutions in embodiments of the present disclosure more clearly, the following briefly describes the accompanying drawings. Apparently, the accompanying drawings show merely some embodiments of the present disclosure, and a person of ordinary skill in the art may derive other drawings from these accompanying drawings without creative efforts.

DETAILED DESCRIPTION

Figure 1:
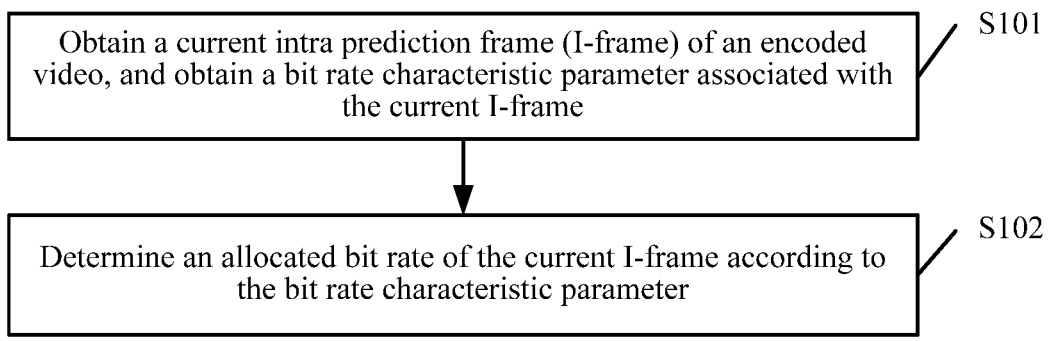
FIG. 1 is a schematic flowchart of a bit rate allocation method according to embodiments of the present invention.

The following describes the technical solutions in the embodiments of the present invention with reference to the accompanying drawings. Apparently, the described embodiments are some of the embodiments of the present invention rather than all of the embodiments. All other embodiments obtained by a person of ordinary skill in the art based on the disclosed embodiments without creative efforts shall fall within the protection scope of the present disclosure.

With the technological development, for ease of video file storage, transmission, and exchange, a video file needs to be encoded. During the video file encoding, an I-frame (an intra prediction frame, a P-frame (an inter prediction frame), and a macroblock (a coding unit) need to be used. To improve video file encoding quality, performance of the I-frame in the video file needs to be improved. Because the I-frame is used as a reference frame for subsequent inter-frame prediction, a suitable bit rate needs to be allocated to the I-frame to ensure the video file quality. According to an I-frame bit rate allocation method, a bit rate ratio of an I-frame to a P-frame in a current GOP (Group of Pictures) is allocated mainly according to an actual bit rate ratio of an I-frame to a P-frame in a previous GOP starting with the I-frame, the allocated bit rate ratio is adjusted with reference to a quantization step, and then a maximum target bit rate of the I-frame is limited according to a remaining bit rate of a buffer. However, because the maximum target bit rate is set according to a single condition (for example, the remaining bit rate of the buffer), the bit rate cannot be correctly allocated to the I-frame, and the video file quality is affected.

A bit rate allocation method according to the embodiments of the present invention may be applied to a scenario in which a terminal device encodes on a video. For example, a bit rate allocation device obtains a current intra prediction frame (I-frame) of a to-be-encoded video, and obtains bit rate characteristic parameters associated with the current I-frame. The bit rate characteristic parameters include: a number of video frames in a GOP in which the current I-frame is located, a pixel number of the current I-frame, and a ratio of an inter prediction macroblock in at least one historical P-frame before the current I-frame, namely, an encoded P-frame. Further, the bit rate allocation device separately obtains a maximum bit rate set of the current I-frame by using each bit rate characteristic parameter. Finally, the bit rate allocation device generates an allocated bit rate of the current I-frame according to the maximum bit rate set. The allocated bit rate of the I-frame is limited by using the number of video frames in the GOP, an image resolution, and a video characteristic, to more precisely allocate the bit rate to the I-frame, ensuring the video file quality.

The bit rate allocation device in the embodiments of the present invention may be a terminal device having a video encoding function, such as a tablet computer, a smartphone, a palmtop computer, or a mobile Internet device (MID).

Figure 2:
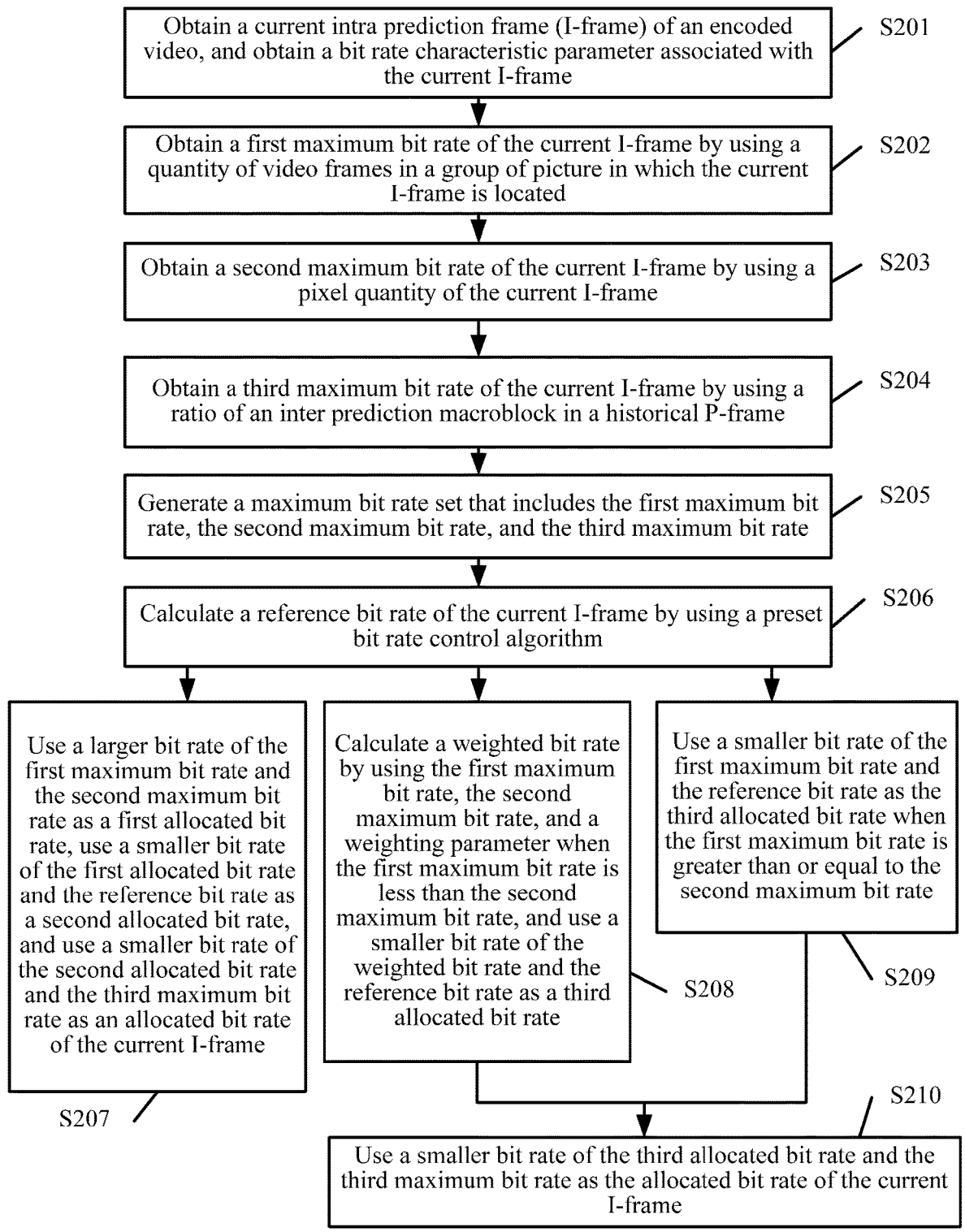
FIG. 2 is a schematic flowchart of another bit rate allocation method according to embodiments of the present invention.

With reference to FIG. 1 and FIG. 2, the following describes in detail the bit rate allocation method provided in the embodiments of the present invention.

FIG. 1 is a schematic flowchart of a bit rate allocation method according to embodiments of the present invention. As shown in FIG. 1, the method may include the following step S101 to step S103:

S101: Obtaining a current I-frame of an encoded video, and obtaining one or more bit-rate characteristic parameters associated with the current I-frame.

Specifically, the bit rate allocation device may obtain the current I-frame of the encoded video, and obtain the bit-rate characteristic parameters associated with the current I-frame. It can be understood that, the bit-rate characteristic parameters may include: a number of video frames in a GOP in which the current I-frame is located, a pixel number of the current I-frame, and a proportion of an inter prediction macroblock in a historical P-frame before the current I-frame. It can be understood that, the I-frame may be used as a reference frame for a subsequent P-frame.

It can be understood that, the number of video frames in the GOP in which the current I-frame is located may be the number of all video frames included in the current GOP in which the current I-frame is located. For example, if the structure of the current GOP is IPPP (one I-frame and three P-frames), the number of video frames in the structure of the GOP in which the current I-frame is located is 4.

It can be understood that, a pixel number of the current I-frame may be a product of the number of horizontal-direction pixels and the number of vertical-direction pixels included in the current I-frame. For example, if width represents the number of horizontal-direction pixels in the current I-frame, and height represents the number of vertical-direction pixels in the current I-frame, the pixel number of the current I-frame is width· height.

It can be understood that, the proportion of the inter prediction macroblock in the historical P-frame before the current I-frame may be a percentage of inter prediction macroblocks in the one or more encoded P-frames that are before the current I-frame, in all macroblocks in P-frames. For example, if there are four inter prediction macroblocks in a P-frame previous to the current I-frame, and there are a total of 16 macroblocks in the P-frame, the proportion of the inter prediction macroblock in the historical P-frame before the current I-frame is 25%. In one embodiment, the historical P-frame before the current I-frame includes: one or more P-frames that is before the current I-frame and is closest to the I-frame.

S102: Determining an allocated bit rate of the current I-frame according to the bit-rate characteristic parameters.

In one embodiment, the allocated bit rate of the I-frame may be a bit rate allocated to the I-frame.

In one embodiment, this determining step may include: separately obtaining a maximum bit rate set of the current I-frame according to each bit-rate characteristic parameter, and determining the allocated bit rate of the current I-frame according to the maximum bit rate set.

In one embodiment, for separately obtaining a maximum bit rate set of the current I-frame according to each bit-rate characteristic parameters, the bit rate allocation device may separately obtain the maximum bit rate set of the current I-frame by using each bit-rate characteristic parameter. It can be understood that, the bit rate allocation device may separately obtain maximum bit rates (which may be set to: $Max_{Isize1}$, $Max_{Isize2}$, and $Max_{Isize3}$) of the current I-frame for three parameters: the number of video frames in the GOP in which the current I-frame is located, the pixel number of the current I-frame, and the proportion of the inter prediction macroblock in the historical P-frame before the current I-frame, and may generate a maximum bit rate set including $Max_{Isize1}$, $Max_{Isize2}$, and $Max_{Isize3}$. $Max_{Isize1}$ is the maximum bit rate determined according to the number of video frames in the GOP in which the current I-frame is located. $Max^{Isize2}$ is the maximum bit rate determined according to the pixel number of the current I-frame. $Max_{Isize3}$ is the maximum bit rate determined according to the parameter of the ratio of the inter prediction macroblock in the historical P-frame before the current I-frame.

In one embodiment, the allocated bit rate of the current I-frame may be generated according to the maximum bit rate set by using the following method.

Specifically, the bit rate allocation device may generate the allocated bit rate of the current I-frame according to the maximum bit rate set. It can be understood that, the bit rate allocation device may first calculate a reference bit rate of the current I-frame by using the bit rate allocation method (for example, the reference bit rate may be set to: $Target_{Isize}$).

The bit rate allocation device may use a larger bit rate of $Max_{Isize1}$ and $Max_{Isize2}$ as the first allocated bit rate, use a smaller bit rate of the first allocated bit rate and the reference bit rate as the second allocated bit rate, and use a smaller bit rate of the second allocated bit rate and $Max_{Isize3}$ as the allocated bit rate of the current I-frame, that is, use min($Max_{Isize\ 3}$, min($Target_{Isize}$, max($Max_{Isize\ 1}$, $Max_{Isize2}$))) as the allocated bit rate of the current I-frame.

When $Max_{Isize1} < Max_{Isize2}$ in the maximum bit rate set, the bit rate allocation device may calculate a weighted bit rate (which may be, for example, $\theta^* Max_{Isize1} + (1-\theta) Max_{Isize2}$) by using $Max_{Isize1}$, $Max_{Isize2}$, and a weighting parameter. $\theta$ is the weighting parameter, and $0 \le \theta \le 1$. For example, the value of $\theta$ may be 0.5. Further, the bit rate allocation device may use a smaller bit rate of the weighted bit rate and the reference bit rate as the third allocated bit rate, for example, use $\min(\text{Target}_{Isize}, (\theta * \text{Max}_{Isize1} + (1-\theta)\text{Max}_{Isize2}))$ as the third allocated bit rate.

Further, when $\text{Max}_{Isize1} \geq \text{Max}_{Isize2}$ the maximum bit rate set, the bit rate allocation device may use a smaller bit rate of $\text{Max}_{Isize1}$ and the reference bit rate as the third allocated bit rate, that is, use $\min(\text{Target}_{Isize}, \text{Max}_{Isize1})$ as the third allocated bit rate.

Finally, the bit rate allocation device may use a smaller bit rate of the third allocated bit rate and $\text{Max}_{Isize3}$ as the allocated bit rate of the current I-frame. That is, when $\text{Max}_{Isize1} < \text{Max}_{Isize\ 2}$, the bit rate allocation device may use $\min(\min(\text{Target}_{Isize}, (\theta * \text{Max}_{Isize1} + (1-\theta)\text{Max}_{Isize2})), \text{Max}_{Isize3})$ as the allocated bit rate of the current I-frame; or when $\text{Max}_{Isize1} \geq \text{Max}_{Isize2}$, the bit rate allocation device may use $\min(\min(\text{Target}_{Isize}, \text{Max}_{Isize1}), \text{Max}_{Isize3})$ as the allocated bit rate of the current I-frame.

In one embodiment, the current I-frame of the encoded video is obtained, and the bit-rate characteristic parameters associated with the current I-frame is obtained. The bit-rate characteristic parameters includes the number of video frames in the GOP in which the current I-frame is located, the pixel number of the current I-frame, and the proportion of the inter prediction macroblock in the historical P-frame before the current I-frame. Then, the maximum bit rate set of the current I-frame is separately obtained by using each bit-rate characteristic parameter, and the allocated bit rate of the current I-frame is generated according to the maximum bit rate set. The allocated bit rate of the I-frame is limited by using the number of video frames in the GOP, an image resolution, and a video characteristic, to more precisely allocate the bit rate to the I-frame, ensuring video file quality.

FIG. 2 is a schematic flowchart of another bit rate allocation method according to embodiments of the present invention. As shown in FIG. 2, the method may include the following step S201 to step S210.

S201: Obtaining a current I-frame of an encoded video, and obtaining bit-rate characteristic parameters associated with the current I-frame.

Specifically, the bit rate allocation device may obtain the current I-frame of the encoded video, and obtain the bit-rate characteristic parameters associated with the current I-frame. The bit-rate characteristic parameters may include: the number of video frames in a GOP in which the current I-frame is located, a pixel number of the current I-frame, and a proportion of an inter prediction macroblock in a historical P-frame before the current I-frame. It can be understood that, the I-frame may be used as a reference frame for a subsequent P-frame.

It can be understood that, the number of video frames in the GOP in which the current I-frame is located may be a number of all video frames included in the current GOP in which the current I-frame is located. For example, if the structure of the current GOP is IPPP, the number of video frames in the GOP in which the current I-frame is located is 4.

It can be understood that, a pixel number of the current I-frame may be a product of quantities of horizontal-direction pixels and vertical-direction pixels included in the current I-frame. For example, if width represents the number of horizontal-direction pixels in the current I-frame, and height represents the number of vertical-direction pixels in the current I-frame, the pixel number of the current I-frame may be width·height.

It can be understood that, the proportion of the inter prediction macroblock in the historical P-frame before the current I-frame may be a proportion of inter prediction macroblocks in the one or more encoded P-frames that are before the current I-frame, in all macroblocks in P-frames. For example, if there are four inter prediction macroblocks in a P-frame previous to the current I-frame, and there are a total of 16 macroblocks in the P-frame, the proportion of the inter prediction macroblock in the historical P-frame before the current I-frame is 25%.

S202: Obtaining a first maximum bit rate of the current I-frame by using the number of video frames in a GOP in which the current I-frame is located.

Specifically, the bit rate allocation device may obtain the first maximum bit rate of the current I-frame by using the number of video frames in the GOP in which the current I-frame is located. For example, the number of video frames in the GOP in which the current I-frame is located may be set to fps, and the first maximum bit rate of the current I-frame may be set to $\text{Max}_{Isize1}$.

In one embodiment, the bit rate allocation device may obtain a target bit rate allocated to the GOP, and calculate an average target bit rate of the GOP by using the target bit rate and the number of video frames. For example, when the target bit rate is $\text{Target}_{bps}$, and the number of video frames is fps, the average target bit rate $\text{Target}_{frame-size}$ may be $\text{Target}_{frame-size} = \text{Target}_{bps}/\text{fps}$.

Further, the bit rate allocation device may calculate the first maximum bit rate $\text{Max}_{Isize1}$ of the current I-frame according to an average target bit rate of each frame. It can be understood that, the first maximum bit rate $\text{Max}_{Isize1}$ may be α times the average target bit rate $\text{Target}_{frame-size}$ of each frame, that is, $\text{Max}_{Isize1} = \alpha * \text{Target}_{frame-size}$. α is a GOP parameter, and α is related to a size of the GOP.

It can be understood that, when the GOP is relatively small, if a bit rate of the current I-frame is excessively large, there are relatively few inter prediction frames that may be used for adjustment, and therefore a smaller α needs to be set; and for a case in which the GOP is relatively large, a may be properly increased. Therefore, a may be set to a decreasing function of the GOP, for example, may be:

$$\alpha = \begin{cases} 4, & GOP \leq 6 \\ 6, & GOP > 6 \end{cases}$$

It can be understood that, when the GOP is less than equal to 6, α is 4, or when the GOP is greater than 6, α is 6.

Further, when the number of video frames is less than or equal to a preset number, the bit rate allocation device may calculate the first maximum bit rate of the current I-frame by using the first GOP parameter and the average target bit rate. For example, for the foregoing a function with respect to the GOP, when the number of video frames is less than or equal to a preset number 6, the bit rate allocation device may calculate the first maximum bit rate of the current I-frame by using the first GOP parameter (that is, α is 4) and the average target bit rate, that is, $\text{Max}_{Isize1} = 4 * \text{Target}_{frame-size}$.

Further, when the number of video frames is greater than the preset number, the bit rate allocation device may calculate the first maximum bit rate of the current I-frame by using the second GOP parameter and the average target bit rate. For example, for the foregoing a function about the GOP, further, when the number of video frames is greater than a preset number 6, the bit rate allocation device may calculate the first maximum bit rate of the current I-frame by using the second GOP parameter (that is, α is 6) and the average target bit rate, that is, $\text{Max}_{Isize1} = 6 * \text{Target}_{frame-size}$.

It can be understood that, the first GOP parameter is less than the second GOP parameter. In one embodiment, the value of the bit rate allocated to the current I-frame is limited by properly adjusting a value of the GOP parameter, so that a bit rate peak generated due to an excessively high I-frame bit rate during real-time communication is reduced.

S203: Obtaining a second maximum bit rate of the current I-frame by using a pixel number of the current I-frame.

Specifically, the bit rate allocation device may obtain the second maximum bit rate of the current I-frame by using the pixel number of the current I-frame. For example, the pixel number of the current I-frame may be set to width·height, and the second maximum bit rate of the current I-frame may be set to $Max_{Isize2}$.

In one embodiment, the bit rate allocation device may obtain a video scenario corresponding to the encoded video, obtain a pixel average bit rate corresponding to the video scenario, and obtain an image adjustment factor corresponding to an image size of the current I-frame. It can be understood that, the video scenario may be, for example, a video compression or transmission scenario that has a relatively high requirement on image quality, or may be a real-time image exchange scenario (for example, when a video chat is performed by using chat software) that has a relatively high requirement on bit rate stability, the pixel average bit rate corresponding to the video scenario may be set to $Max_{bpp}$, and the image adjustment factor corresponding to the image size of the current I-frame may be set to $\beta_{width·height}$.

It can be understood that, as an average bit rate of each pixel, $Max_{bpp}$ may be set according to an actual application scenario. In a scenario that has a relatively high requirement on the image quality, $Max_{bpp}$ may be increased. In a scenario that has a relatively high requirement on the bit rate stability, $Max_{bpp}$ may be decreased.

It can be understood that, $\beta_{width·height}$ is the image adjustment factor corresponding to the image size. Usually, a large-size image has relatively high space relativity, and a compression rate of the large-size image is higher than that of a small-size image. Therefore, a relatively small image adjustment factor $\beta_{width·height}$ is set for the large-size image, and a relatively large image adjustment factor $\beta_{width·height}$ is set for the small-size image.

Further, the bit rate allocation device may calculate a second maximum bit rate of the current I-frame by using the pixel average bit rate, the image adjustment factor, and the pixel quantity. For example, the second maximum bit rate may be:

$$Max_{Isize2} = \beta_{width·height} \cdot Max_{bpp} \cdot width \cdot height$$

In one embodiment, in different video scenarios, the impact that an excessively low bit rate of the current I-frame has on video file quality is reduced due to an effect of coordinated adjustment of the pixel average bit rate and the image adjustment factor.

S204: Obtaining a third maximum bit rate of the current I-frame by using a proportion of an inter prediction macroblock in a historical P-frame.

Specifically, the bit rate allocation device may obtain the third maximum bit rate of the current I-frame by using the proportion of the inter prediction macroblock in the historical P-frame. For example, the proportion of the inter prediction macroblock in the historical P-frame may be set to $MB_{intra}$, and the third maximum bit rate of the current I-frame may be set to $Max_{Isize3}$.

In one embodiment, the bit rate allocation device may obtain a target bit rate allocated to the GOP, and calculate an average target bit rate of the GOP by using the target bit rate and the number of video frames. It can be understood that, the bit rate allocation device may calculate the average target bit rate of the GOP by using the method described in step 202, that is, $Target_{frame-size} = Target_{bps}/fps$.

Further, the bit rate allocation device may obtain a ratio range of the proportion of the inter prediction macroblock in the historical P-frame, and obtain a bit rate adjustment parameter corresponding to the ratio range. It can be understood that, the ratio $MB_{intra}$ of the inter prediction macroblock in the historical P-frame indicates a proportion of inter prediction macroblocks in n P-frames before the current I-frame, larger $MB_{intra}$ indicates a more violent movement in an image, smaller $MB_{intra}$ indicates a more still status in the image, the bit rate adjustment parameter corresponding to the ratio range of the ratio $MB_{intra}$ may be set to γ.

It can be understood that, smaller $MB_{intra}$ indicates larger γ, in other words, a larger third maximum bit rate $Max_{Isize3}$ of the current I-frame relative to the average target bit rate $Target_{frame-size}$; on the contrary, larger $MB_{intra}$ indicates smaller γ, and smaller $Max_{Isize3}$ relative to $Target_{frame-size}$.

Further, the bit rate allocation device may calculate the third maximum bit rate of the current I-frame by using the bit rate adjustment parameter and the average target bit rate, that is $Max_{Isize3} = γ * Target_{frame-size}$. It can be understood that, the bit rate allocation device may implement function calculation for $M_{Isize3}$ by using a simple piecewise function as follows:

$$Max_{Isize3} = \begin{cases} 15 \times T \arg et_{frame-size} & MB_{int\,r} < 2\% \\ 7.5 \times T \arg et_{frame-size} & 2\% \leq MB_{int\,r} < 10\% \\ 5 \times T \arg et_{frame-size} & 10\% \leq MB_{int\,r} < 25\% \\ 3.5 \times T \arg et_{frame-size} & 25\% \leq MB_{int\,r} < 50\% \\ 2.5 \times T \arg et_{frame-size} & MB_{int\,r} \geq 50\% \end{cases}$$

S205: Generate a maximum bit rate set that includes the first maximum bit rate, the second maximum bit rate, and the third maximum bit rate.

Specifically, the bit rate allocation device may generate the maximum bit rate set that includes the first maximum bit rate $Max_{Isize1}$, the second maximum bit rate $Max_{Isize2}$, and the third maximum bit rate $Max_{Isize3}$.

S206: Calculate a reference bit rate of the current I-frame by using a preset bit rate control algorithm.

Specifically, after obtaining the maximum bit rate set, the bit rate allocation device may calculate the reference bit rate of the current I-frame by using the preset bit rate control algorithm. It can be understood that, the preset bit rate control algorithm may be any appropriate bit rate control algorithm, such as a bit rate allocation method provided in the H.264 standard. The reference bit rate of the current I-frame may be used together with the maximum bit rates in the maximum bit rate set, to limit allocation of a bit rate to the current I-frame. It can be understood that, the reference bit rate may be set to $Target_{Isize}$.

S207: Use a larger bit rate of the first maximum bit rate and the second maximum bit rate as a first allocated bit rate, use a smaller bit rate of the first allocated bit rate and the reference bit rate as a second allocated bit rate, and use a smaller bit rate of the second allocated bit rate and the third maximum bit rate as an allocated bit rate of the current I-frame.

Specifically, the bit rate allocation device may use the larger bit rate of the first maximum bit rate and the second maximum bit rate as the first allocated bit rate, that is, use $\max(\text{Max}_{Isize1}, \text{Max}_{Isize2})$ as the first allocated bit rate. Further, the bit rate allocation device may use the smaller bit rate of the first allocated bit rate and the reference bit rate as the second allocated bit rate, that is, may use $\min(\text{Target}_{Isize}, \max(\text{Max}_{Isize1}, \text{Max}_{Isize2}))$ as the second allocated bit rate. Further, the bit rate allocation device may use the smaller bit rate of the second allocated bit rate and the third maximum bit rate as the allocated bit rate of the current I-frame that is use $\min(\text{Max}_{Isize3}, \min(\text{Target}_{Isize}, \max(\text{Max}_{Isize1}, \text{Max}_{Isize2})))$ as the allocated bit rate of the current I-frame.

S208: Calculating a weighted bit rate by using the first maximum bit rate, the second maximum bit rate, and a weighting parameter when the first maximum bit rate is less than the second maximum bit rate, and using a smaller bit rate of the weighted bit rate and the reference bit rate as a third allocated bit rate.

Specifically, when the first maximum bit rate is less than the second maximum bit rate (that is, $\text{Max}_{Isize1} < \text{Max}_{Isize2}$), the bit rate allocation device may calculate the weighted bit rate by using the first maximum bit rate, the second maximum bit rate, and the weighting parameter. It can be understood that, the weighting parameter may be set to θ, and 0≤θ≤1. Herein, a value of θ may be 0.5, and the weighted bit rate may be: $\theta^* \text{Max}_{Isize1} + (1-\theta)\text{Max}_{Isize2}$.

In one embodiment, the bit rate allocation device may use a smaller bit rate of the weighted bit rate and the reference bit rate as the third allocated bit rate, that is, use $\min(\text{Target}_{Isize}, (\theta^* \text{Max}_{Isize1} + (1-\theta)\text{Max}_{Isize2}))$ as the third allocated bit rate.

S209: Use a smaller bit rate of the first maximum bit rate and the reference bit rate as the third allocated bit rate when the first maximum bit rate is greater than or equal to the second maximum bit rate.

In one embodiment, when the first maximum bit rate is greater than or equal to the second maximum bit rate (that is, $\text{Max}_{Isize1} \geq \text{Max}_{Isize2}$) the bit rate allocation device may use the smaller bit rate of the first maximum bit rate and the reference bit rate as the third allocated bit rate, that is, use $\min(\text{Target}_{Isize}, \text{Max}_{Isize1})$ as the third allocated bit rate.

S210: Use a smaller bit rate of the third allocated bit rate and the third maximum bit rate as the allocated bit rate of the current I-frame.

Specifically, the bit rate allocation device may use the smaller bit rate of the third allocated bit rate and the third maximum bit rate as the allocated bit rate of the current I-frame.

It can be understood that, when $\text{Max}_{Isize1} < \text{Max}_{Isize2}$, the bit rate allocation device may use $\min(\min(\text{Target}_{Isize}, (\theta^* \text{Max}_{Isize1} + (1-\theta)\text{Max}_{Isize2})), \text{Max}_{Isize3})$ as the allocated bit rate of the current I-frame.

When $\text{Max}_{Isize1} \geq \text{Max}_{Isize2}$, the bit rate allocation device may use $\min(\min(\text{Target}_{Isize}, \text{Max}_{Isize1}), \text{Max}_{Isize3})$ as the allocated bit rate of the current I-frame.

In one embodiment, the current I-frame of the encoded video is obtained, and the bit-rate characteristic parameters associated with the current I-frame is obtained. The bit-rate characteristic parameters includes the number of video frames in the GOP in which the current I-frame is located, the pixel number of the current I-frame, and the proportion of the inter prediction macroblock to the historical P-frame before the current I-frame. Then, the maximum bit rate set of the current I-frame is separately obtained by using each bit-rate characteristic parameter, and finally the allocated bit rate of the current I-frame is generated according to the maximum bit rate set. The allocated bit rate of the I-frame is limited by using the number of video frames in the GOP, an image resolution, and a video characteristic, to more precisely allocate the bit rate to the I-frame, ensuring video file quality. The value of the bit rate allocated to the current I-frame is limited by properly adjusting the value of the GOP parameter, so that the bit rate peak generated due to the excessively high I-frame bit rate during the real-time communication is reduced. In the different video scenarios, the impact that the excessively low bit rate of the current I-frame has on the video file quality is reduced due to the effect of the coordinated adjustment of the pixel average bit rate and the image adjustment factor.

With reference to FIG. 3 to FIG. 6, the following describes in detail a bit rate allocation device provided in an embodiment of the present invention. It should be noted that, the bit rate allocation device shown in FIG. 3 to FIG. 6 is configured to perform the method in the embodiments shown in FIG. 1 and FIG. 2 of the present disclosure. For ease of description, only a part related to one embodiment is described. For specific technical details that are not disclosed, refer to the embodiments shown in FIG. 1 and FIG. 2 of the present disclosure.

Figure 3:
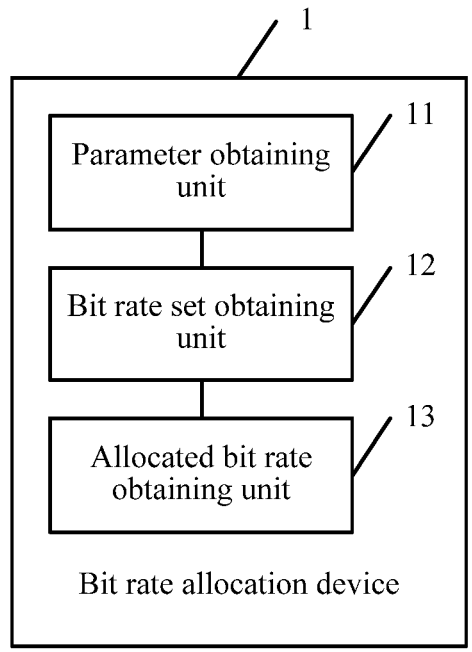
FIG. 3 is a schematic structural diagram of a bit rate allocation device according to embodiments of the present invention.

FIG. 3 is a schematic structural diagram of a bit rate allocation device according to embodiments of the present invention. As shown in FIG. 3, the bit rate allocation device 1 in one embodiment may include: a parameter obtaining unit 11, a bit rate set obtaining unit 12, and an allocated bit rate obtaining unit 13.

The parameter obtaining unit 11 is configured to: obtain a current I-frame of an encoded video, and obtain a bit-rate characteristic parameters associated with the current I-frame.

During specific implementation, the parameter obtaining unit 11 may obtain the current I-frame of the encoded video, and obtain the bit-rate characteristic parameters associated with the current I-frame. It can be understood that, the bit-rate characteristic parameters may include: a number of video frames in a GOP in which the current I-frame is located, a pixel number of the current I-frame, and a proportion of an inter prediction macroblock in a historical P-frame before the current I-frame. It can be understood that, the I-frame may be used as a reference frame for a subsequent P-frame.

It can be understood that, the number of video frames in the GOP in which the current I-frame is located may be a number of all video frames included in the current GOP in which the current I-frame is located. For example, if a structure of the current GOP is IPPP, the number of video frames in a structure of the GOP in which the current I-frame is located is 4.

It can be understood that, a pixel number of the current I-frame may be a product of quantities of horizontal-direction pixels and vertical-direction pixels included in the current I-frame. For example, if width represents the number of horizontal-direction pixels in the current I-frame, and height represents the number of vertical-direction pixels in the current I-frame, the pixel number of the current I-frame may be width·height.

It can be understood that, the proportion of the inter prediction macroblock in the historical P-frame before the current I-frame may be a proportion of inter prediction macroblocks in the one or more encoded P-frames that are before the current I-frame, in all macroblocks in P-frames. For example, if there are four inter prediction macroblocks in a P-frame previous to the current I-frame, and there are a total of 16 macroblocks in the P-frame, the proportion of the inter prediction macroblock in the historical P-frame before the current I-frame is 25%.

The bit rate set obtaining unit 12 is configured to separately obtain a maximum bit rate set of the current I-frame by using the bit-rate characteristic parameter.

During specific implementation, the bit rate set obtaining unit 12 may separately obtain a maximum bit rate set of the current I-frame by using the bit-rate characteristic parameter. It can be understood that, the bit rate set obtaining unit 12 may separately obtain maximum bit rates of the current I-frame for three parameters by using the parameters: the number of video frames in the GOP in which the current I-frame is located, the pixel number of the current I-frame, and the proportion of the inter prediction macroblock in the historical P-frame before the current I-frame, and may generate the maximum bit rate set including the maximum bit rates.

Figure 4:
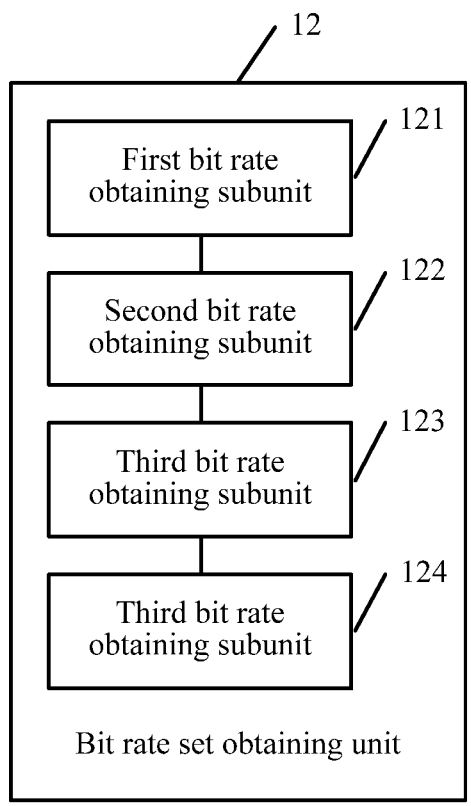
FIG. 4 is a schematic structural diagram of a bit rate set obtaining unit according to embodiments of the present invention.

Specifically, FIG. 4 is a schematic structural diagram of a bit rate set obtaining unit according to embodiments of the present invention. As shown in FIG. 4, the bit rate set obtaining unit 12 may include: a first bit rate obtaining subunit 121, a second bit rate obtaining subunit 122, a third bit rate obtaining subunit 123, a bit rate set generation subunit 124, and an allocated bit rate obtaining unit 13.

The first bit rate obtaining subunit 121 is configured to obtain a first maximum bit rate of a current I-frame by using a number of video frames in a GOP in which the current I-frame is located.

During specific implementation, the first bit rate obtaining subunit 121 may obtain the first maximum bit rate of the current I-frame by using the number of video frames in the GOP in which the current I-frame is located. For example, the number of video frames in the GOP in which the current I-frame is located may be set to fps, and the first maximum bit rate of the current I-frame may be set to $Max_{Isize1}$.

In one embodiment, the first bit rate obtaining subunit 121 is specifically configured to: obtain a target bit rate allocated to the GOP, and calculate an average target bit rate of the GOP by using the target bit rate and the number of video frames. For example, when the target bit rate is $Target_{bps}$, and the number of video frames is fps, the average target bit rate $Target_{frame-size}$ may be $Target_{frame-size}=Target_{bps}/fps$.

Further, the first bit rate obtaining subunit 121 may calculate the first maximum bit rate $Max_{Isize1}$ of the current I-frame according to an average target bit rate of each frame. It can be understood that, the first maximum bit rate $Max_{Isize1}$ may be $\alpha$ times the average target bit rate $Target_{frame-size}$ of each frame, that is, $Max_{Isize1}=\alpha*Target_{frame-size}$. $\alpha$ is a GOP parameter, and $\alpha$ is related to a size of the GOP.

It can be understood that, for a case in which the GOP is relatively small, if a bit rate of the current I-frame is excessively large, there are relatively few inter prediction frames that may be used for adjustment, and therefore a smaller $\alpha$ needs to be set; and for a case in which the GOP is relatively large, a may be properly increased. Therefore, a may be set to a decreasing function of the GOP, for example, may be:

$$\alpha = \begin{cases} 4, GOP \leq 6 \\ 6, GOP > 6 \end{cases}$$

It can be understood that, when the GOP is less than equal to 6, $\alpha$ is 4, or when the GOP is greater than 6, $\alpha$ is 6.

Further, when the number of video frames is less than or equal to a preset number, the first bit rate obtaining subunit 121 may calculate the first maximum bit rate of the current I-frame by using the first GOP parameter and the average target bit rate. For example, for the foregoing a function about the GOP, further, when the number of video frames is less than or equal to a preset number 6, the bit rate allocation device may calculate the first maximum bit rate of the current I-frame by using the first GOP parameter (that is, $\alpha$ is 4) and the average target bit rate, that is, $Max_{Isize1}=4*Target_{frame-size}$.

Further, when the number of video frames is greater than the preset number, the first bit rate obtaining subunit 121 may calculate the first maximum bit rate of the current I-frame by using the second GOP parameter and the average target bit rate. For example, for the foregoing a function about the GOP, further, when the number of video frames is greater than a preset number 6, the bit rate allocation device may calculate the first maximum bit rate of the current I-frame by using the second GOP parameter (that is, $\alpha$ is 6) and the average target bit rate, that is, $Max_{Isize1}=6*Target_{frame-size}$.

It can be understood that, the first GOP parameter is less than the second GOP parameter.

In one embodiment, a value of the bit rate allocated to the current I-frame is limited by properly adjusting a value of the GOP parameter, so that a bit rate peak generated due to an excessively high I-frame bit rate during real-time communication is reduced.

The second bit rate obtaining subunit 122 is configured to obtain a second maximum bit rate of the current I-frame by using a pixel number of the current I-frame.

During specific implementation, the second bit rate obtaining subunit 122 may obtain the second maximum bit rate of the current I-frame by using the pixel number of the current I-frame. For example, the pixel number of the current I-frame may be set to width·height, and the second maximum bit rate of the current I-frame may be set to $Max_{Isize2}$.

In one embodiment, the second bit rate obtaining subunit 122 is specifically configured to: obtain a video scenario corresponding to the encoded video, obtain a pixel average bit rate corresponding to the video scenario, and obtain an image adjustment factor corresponding to an image size of the current I-frame. It can be understood that, the video scenario may be, for example, a video compression or transmission scenario that has a relatively high requirement on image quality, or may be a real-time image exchange scenario (for example, when a video chat is performed by using chat software) that has a relatively high requirement on bit rate stability, the pixel average bit rate corresponding to the video scenario may be set to $Max_{bpp}$, and the image adjustment factor corresponding to the image size of the current I-frame may be set to $\beta_{width·height}$.

It can be understood that, as an average bit rate of each pixel, $Max_{bpp}$ may be set according to an actual application scenario. In a scenario that has a relatively high requirement on the image quality, $Max_{bpp}$ may be increased. In a scenario that has a relatively high requirement on the bit rate stability, $Max_{bpp}$ may be decreased.

It can be understood that, $\beta_{width·height}$ is the image adjustment factor corresponding to the image size. Usually, a large-size image has relatively high space relativity, and a compression rate of the large-size image is higher than that of a small-size image. Therefore, a relatively small image adjustment factor $\beta_{width·height}$ is set for the large-size image, and a relatively large image adjustment factor $\beta_{width·height}$ is set for the small-size image.

Further, the second bit rate obtaining subunit 122 may calculate a second maximum bit rate of the current I-frame by using the pixel average bit rate, the image adjustment factor, and the pixel quantity. For example, the second maximum bit rate may be:

$$\text{Max}_{Isize2} = \beta_{width \cdot height} \cdot \text{Max}_{bpp} \cdot width \cdot height$$

In one embodiment, in different video scenarios, impact that an excessively low bit rate of the current I-frame has on video file quality is reduced due to an effect of coordinated adjustment of the pixel average bit rate and the image adjustment factor.

The third bit rate obtaining subunit 123 is configured to obtain a third maximum bit rate of the current I-frame by using a proportion of an inter prediction macroblock in a historical P-frame.

During specific implementation, the third bit rate obtaining subunit 123 may obtain the third maximum bit rate of the current I-frame by using the proportion of the inter prediction macroblock in the historical P-frame. For example, the proportion of the inter prediction macroblock in the historical P-frame may be set to $MB_{intra}$ and the third maximum bit rate of the current I-frame may be set to $\text{Max}_{Isize3}$.

In one embodiment, the third bit rate obtaining subunit 123 is specifically configured to: obtain a target bit rate allocated to the GOP, and calculate an average target bit rate of the GOP by using the target bit rate and the number of video frames. It can be understood that, the third bit rate obtaining subunit 123 may calculate the average target bit rate of the GOP by using the method described for the first bit rate obtaining subunit 121, that is, $\text{Target}_{frame-size} = \text{Target}_{bps}/\text{fps}$.

Further, the third bit rate obtaining subunit 123 may obtain a ratio range of the proportion of the inter prediction macroblock in the historical P-frame, and obtain a bit rate adjustment parameter corresponding to the ratio range. It can be understood that, the ratio $MB_{intra}$ of the inter prediction macroblock in the historical P-frame indicates a proportion of inter prediction macroblocks in n P-frames before the current I-frame, larger $MB_{intra}$ indicates a stronger movement in an image, smaller $MB_{intra}$ indicates a more still status in the image, the bit rate adjustment parameter corresponding to the ratio range of the ratio $MB_{intra}$ may be set to $\gamma$.

It can be understood that, smaller $MB_{intra}$ indicates larger $\gamma$, in other words, a larger third maximum bit rate $\text{Max}_{Isize3}$ of the current I-frame relative to the average target bit rate $\text{Target}_{frame-size}$; on the contrary, larger $MB_{intra}$ indicates smaller $\gamma$, and smaller $\text{Max}_{Isize3}$ relative to $\text{Target}_{frame-size}$.

Further, the third bit rate obtaining subunit 123 may calculate the third maximum bit rate of the current I-frame by using the bit rate adjustment parameter and the average target bit rate, that is, $\text{Max}_{Isize3} = \gamma * \text{Target}_{frame-size}$. It can be understood that, the third bit rate obtaining subunit 123 may implement function calculation for $\text{Max}_{Isize3}$ by using a simple piecewise function as follows:

$$\text{Max}_{Isize3} = \begin{cases} 15 \times T \text{ arg} et_{frame-size} & MB_{int\ r} < 2\% \\ 7.5 \times T \text{ arg} et_{frame-size} & 2\% \leq MB_{int\ r} < 10\% \\ 5 \times T \text{ arg} et_{frame-size} & 10\% \leq MB_{int\ r} < 25\% \\ 3.5 \times T \text{ arg} et_{frame-size} & 25\% \leq MB_{int\ r} < 50\% \\ 2.5 \times T \text{ arg} et_{frame-size} & MB_{int\ r} \geq 50\% \end{cases}$$

The bit rate set generation subunit 124 is configured to generate a maximum bit rate set that includes the first maximum bit rate, the second maximum bit rate, and the third maximum bit rate.

During specific implementation, the bit rate set generation subunit 124 may generate the maximum bit rate set that includes the first maximum bit rate $\text{Max}_{Isize1}$, the second maximum bit rate $\text{Max}_{Isize2}$ and the third maximum bit rate $\text{Max}_{Isize3}$.

The allocated bit rate obtaining unit 13 is configured to generate an allocated bit rate of the current I-frame according to the maximum bit rate set.

During specific implementation, the allocated bit rate obtaining unit 13 may generate the allocated bit rate of the current I-frame according to the maximum bit rate set.

Figure 5:
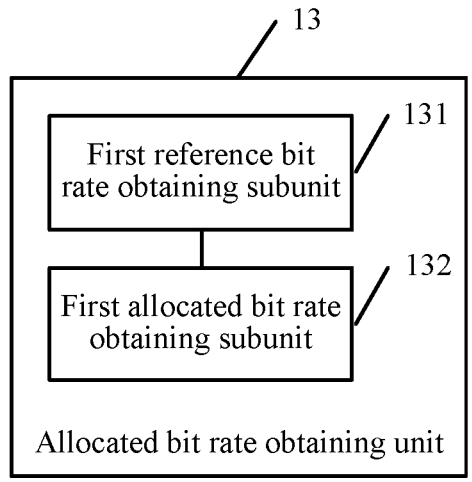
FIG. 5 is a schematic structural diagram of an allocated bit rate obtaining unit according to embodiments of the present invention.

Specifically, FIG. 5 is a schematic structural diagram of an allocated bit rate obtaining unit according to embodiments of the present invention. As shown in FIG. 5, the allocated bit rate obtaining unit 13 may include: a first reference bit rate obtaining subunit 131 and a first allocated bit rate obtaining subunit 132.

The first reference bit rate obtaining subunit 131 is configured to calculate a reference bit rate of a current I-frame by using a preset bit rate control algorithm.

During specific implementation, after the bit rate set obtaining unit 12 obtains the maximum bit rate set, the first reference bit rate obtaining subunit 131 may calculate the reference bit rate of the current I-frame by using the preset bit rate control algorithm. It can be understood that, the preset bit rate control algorithm may be any bit rate control algorithm, such as a bit rate allocation method provided in the H.264 standard. The reference bit rate of the current I-frame may be used together with the maximum bit rates in the maximum bit rate set, to limit allocation of a bit rate to the current I-frame. It can be understood that, the reference bit rate may be set to $\text{Target}_{Isize}$.

The first allocated bit rate obtaining subunit 132 is configured to: use a larger bit rate of the first maximum bit rate and the second maximum bit rate as a first allocated bit rate, use a smaller bit rate of the first allocated bit rate and the reference bit rate as a second allocated bit rate, and use a smaller bit rate of the second allocated bit rate and the third maximum bit rate as the allocated bit rate of the current I-frame.

During specific implementation, the first allocated bit rate obtaining subunit 132 may use the larger bit rate of the first maximum bit rate and the second maximum bit rate as the first allocated bit rate, that is, use $\max(\text{Max}_{Isize1}, \text{Max}_{Isize2})$ as the first allocated bit rate. Further, the first allocated bit rate obtaining subunit 132 may use the smaller bit rate of the first allocated bit rate and the reference bit rate as the second allocated bit rate, that is, may use $\min(\text{Target}_{Isize}, \max(\text{Max}_{Isize1}, \text{Max}_{Isize2}))$ as the second allocated bit rate. Further, the first allocated bit rate obtaining subunit 132 may use the smaller bit rate of the second allocated bit rate and the third maximum bit rate as the allocated bit rate of the current I-frame, that is, use $\min(\text{Max}_{Isize3}, \min(\text{Target}_{Isize}, \max(\text{Max}_{Isize2})))$ as the allocated bit rate of the current I-frame.

Figure 6:
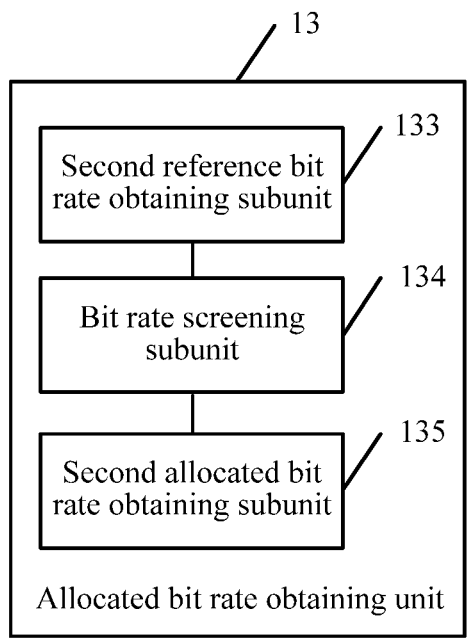
FIG. 6 is another schematic structural diagram of an allocated bit rate obtaining unit according to embodiments of the present invention.

Specifically, FIG. 6 is another schematic structural diagram of an allocated bit rate obtaining unit according to embodiments of the present invention. As shown in FIG. 6, the allocated bit rate obtaining unit 13 may include: a second reference bit rate obtaining subunit 133, a bit rate screening subunit 134, a second allocated bit rate obtaining subunit 135.

The second reference bit rate obtaining subunit 133 is configured to calculate a reference bit rate of a current I-frame by using a preset bit rate control algorithm.

During specific implementation, the second reference bit rate obtaining subunit 133 may calculate the reference bit rate of the current I-frame by using the preset bit rate control algorithm that is the same as that used by the first reference bit rate obtaining subunit 131. For a specific implementation process, refer to the descriptions in the foregoing method embodiments. Details are not described herein again.

The bit rate screening subunit 134 is configured to: calculate a weighted bit rate by using the first maximum bit rate, the second maximum bit rate, and a weighting parameter when the first maximum bit rate is less than the second maximum bit rate, and use a smaller bit rate of the weighted bit rate and the reference bit rate as a third allocated bit rate.

During specific implementation, when the first maximum bit rate is less than the second maximum bit rate (that is, $Max_{Isize1} < Max_{Isize2}$), the bit rate screening subunit 134 may calculate the weighted bit rate by using the first maximum bit rate, the second maximum bit rate, and the weighting parameter. It can be understood that, the weighting parameter may be set to θ, and 0≤θ≤1. Herein, a value of θ may be 0.5, and the weighted bit rate may be: $\theta * Max_{Isize1} + (1-\theta) Max_{Isize2}$.

In one embodiment, the bit rate screening subunit may use a smaller bit rate of the weighted bit rate and the reference bit rate as the third allocated bit rate, that is, use min($Target_{Isize}$, ($\theta * Max_{Isize1} + (1-\theta) Max_{Isize2}$)) as the third allocated bit rate.

The bit rate screening subunit 134 is further configured to use a smaller bit rate of the first maximum bit rate and the reference bit rate as the third allocated bit rate when the first maximum bit rate is less than or equal to the second maximum bit rate.

In one embodiment, when the first maximum bit rate is greater than or equal to the second maximum bit rate (that is, $Max_{Isize1} \geq Max_{Isize2}$) the bit rate screening subunit 134 may use the smaller bit rate of the first maximum bit rate and the reference bit rate as the third allocated bit rate, that is, use min($Target_{Isize}$, $Max_{Isize1}$) as the third allocated bit rate.

The second allocated bit rate obtaining subunit 135 is configured to use a smaller bit rate of the third allocated bit rate and the third maximum bit rate as an allocated bit rate of the current I-frame.

During specific implementation, the second allocated bit rate obtaining subunit 135 may use the smaller bit rate of the third allocated bit rate and the third maximum bit rate as the allocated bit rate of the current I-frame.

It can be understood that, when $Max_{Isize1} < Max_{Isize2}$, the second allocated bit rate obtaining subunit 135 may use min(min($Target_{Isize}$, ($\theta * Max_{Isize1} + (1-\theta) Max_{Isize2}$)), $Max_{Isize3}$) as the allocated bit rate of the current I-frame.

When $Max_{Isize1} \geq Max_{Isize2}$, the second allocated bit rate obtaining subunit 135 may use min(min($Target_{Isize}$, $Max_{Isize1}$), $Max_{Isize3}$) as the allocated bit rate of the current I-frame.

In one embodiment, the current I-frame of the encoded video is obtained, and the bit-rate characteristic parameters associated with the current I-frame is obtained. The bit-rate characteristic parameters includes the number of video frames in the GOP in which the current I-frame is located, the pixel number of the current I-frame, and the proportion of the inter prediction macroblock in the historical P-frame before the current I-frame. Then, the maximum bit rate set of the current I-frame is separately obtained by using each bit-rate characteristic parameter, and finally the allocated bit rate of the current I-frame is generated according to the maximum bit rate set. The allocated bit rate of the I-frame is limited by using the number of video frames in the GOP, an image resolution, and a video characteristic, to more precisely allocate the bit rate to the I-frame, ensuring video file quality. The value of the bit rate allocated to the current I-frame is limited by properly adjusting the value of the GOP parameter, so that the bit rate peak generated due to the excessively high I-frame bit rate during the real-time communication is reduced. In the different video scenarios, the impact that the excessively low bit rate of the current I-frame has on the video file quality is reduced due to the effect of the coordinated adjustment of the pixel average bit rate and the image adjustment factor.

Figure 7:
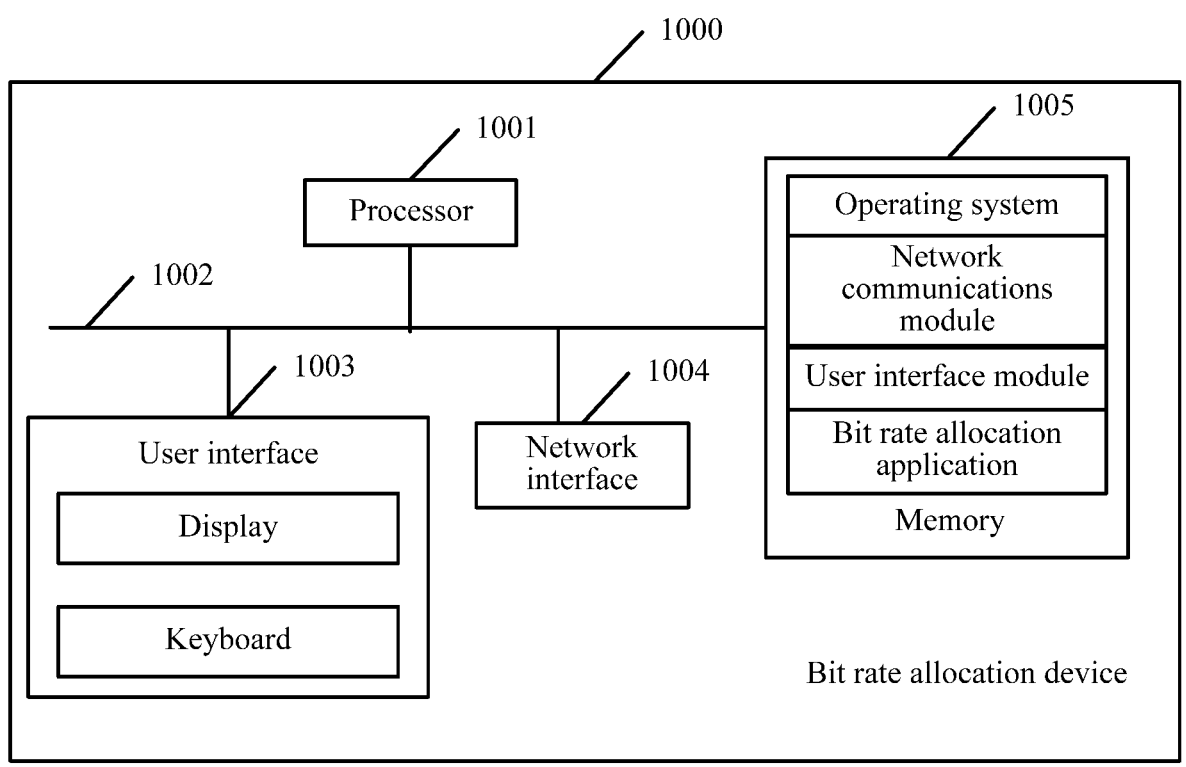
FIG. 7 is a schematic structural diagram of another bit rate allocation device according to embodiments of the present invention.

FIG. 7 is a schematic structural diagram of another bit rate allocation device according to embodiments of the present invention. As shown in FIG. 7, the bit rate allocation device 1000 may include: at least one processor 1001, such as a CPU, at least one network interface 1004, a user interface 1003, a memory 1005, and at least one communications bus 1002. The communications bus 1002 is configured to implement connection and communication between these components. The user interface 1003 may include a display and a keyboard. The user interface 1003 may further include a standard wired interface and a standard wireless interface. The network interface 1004 may include a standard wired interface and a standard wireless interface (such as a Wi-Fi interface). The memory 1005 may be a non-volatile memory, or may be a high-speed RAM memory, or may be a non-volatile memory, such as at least one magnetic disk memory. The memory 1005 may alternatively be at least one storage apparatus located away from the processor 1001. As shown in FIG. 7, as a computer storage medium, the memory 1005 may include an operating system, a network communications module, a user interface module, and a bit rate allocation application that may be a machine-readable instruction.

In the bit rate allocation device 1000 shown in FIG. 7, the user interface 1003 is mainly configured to: provide an input interface to a user, and obtain data input by the user; the network interface 1004 is configured to perform data communication with a user terminal; and the processor 1001 may be configured to invoke the bit rate allocation application stored in the memory 1005, to perform the methods shown in FIG. 1 and FIG. 2, and run the devices shown in FIG. 3 to FIG. 6, for example, perform the following operations: obtaining a current I-frame of a to-be-encoded video, and obtaining a bit-rate characteristic parameters associated with the current I-frame, where the bit-rate characteristic parameters includes: a number of video frames in a GOP in which the current I-frame is located, a pixel number of the current I-frame, and a proportion of an inter prediction macroblock in a historical P-frame before the current I-frame; and determining an allocated bit rate of the I-frame according to each bit-rate characteristic parameter.

In one embodiment, when performing separately obtaining a maximum bit rate set of the current I-frame by using the bit-rate characteristic parameter, the processor 1001 specifically performs the following operations: separately obtaining the maximum bit rate set of the current I-frame by using each bit-rate characteristic parameter; and generating the allocated bit rate of the current I-frame according to the maximum bit rate set.

In an embodiment, when performing separately obtaining a maximum bit rate set of the current I-frame by using the bit-rate characteristic parameter, the processor 1001 specifically performs the following operations: obtaining a first maximum bit rate of the current I-frame by using a number of video frames in a GOP in which the current I-frame is located; obtaining a second maximum bit rate of the current I-frame by using the pixel number of the current I-frame; obtaining a third maximum bit rate of the current I-frame by using the proportion of the inter prediction macroblock in the historical P-frame; and generating the maximum bit rate set that includes the first maximum bit rate, the second maximum bit rate, and the third maximum bit rate.

In an embodiment, when performing the obtaining a first maximum bit rate of the current I-frame by using a number of video frames in a GOP in which the current I-frame is located, the processor 1001 specifically performs the following operations: obtaining a target bit rate allocated to the GOP, and calculating an average target bit rate of the GOP by using the target bit rate and the number of video frames; calculating the first maximum bit rate of the current I-frame by using a first GOP parameter and the average target bit rate when the number of video frames is less than or equal to a preset number; and calculating the first maximum bit rate of the current I-frame by using a second GOP parameter and the average target bit rate when the number of video frames is greater than the preset number, where the first GOP parameter is less than the second GOP parameter.

In an embodiment, when performing the obtaining a second maximum bit rate of the current I-frame by using the pixel number of the current I-frame, the processor 1001 specifically performs the following operations: obtaining a video scenario corresponding to the to-be-encoded video, obtain a pixel average bit rate corresponding to the video scenario, and obtaining an image adjustment factor corresponding to an image size of the current I-frame; and calculating the second maximum bit rate of the current I-frame by using the pixel average bit rate, the image adjustment factor, and the pixel quantity.

In an embodiment, when performing the obtaining a third maximum bit rate of the current I-frame by using the proportion of the inter prediction macroblock in the historical P-frame, the processor 1001 specifically performs the following operations: obtaining a target bit rate allocated to the GOP, and calculating an average target bit rate of the GOP by using the target bit rate and the number of video frames; obtaining a ratio range of the proportion of the inter prediction macroblock in the historical P-frame, and obtaining a bit rate adjustment parameter corresponding to the ratio range; and calculating the third maximum bit rate of the current I-frame by using the bit rate adjustment parameter and the average target bit rate.

In an embodiment, when performing the generating the allocated bit rate of the current I-frame according to the maximum bit rate set, the processor 1001 specifically performs the following operations: calculating a reference bit rate of the current I-frame by using a preset bit rate control algorithm; and using a larger bit rate of the first maximum bit rate and the second maximum bit rate as a first allocated bit rate, using a smaller bit rate of the first allocated bit rate and the reference bit rate as a second allocated bit rate, and using a smaller bit rate of the second allocated bit rate and the third maximum bit rate as the allocated bit rate of the current I-frame.

In an embodiment, when performing the generating the allocated bit rate of the current I-frame according to the maximum bit rate set, the processor 1001 specifically performs the following operations: calculating a reference bit rate of the current I-frame by using a preset bit rate control algorithm; calculating a weighted bit rate by using the first maximum bit rate, the second maximum bit rate, and a weighting parameter when the first maximum bit rate is less than the second maximum bit rate, and using a smaller bit rate of the weighted bit rate and the reference bit rate as a third allocated bit rate; using a smaller bit rate of the first maximum bit rate and the reference bit rate as the third allocated bit rate when the first maximum bit rate is greater than or equal to the second maximum bit rate; and using a smaller bit rate of the third allocated bit rate and the third maximum bit rate as the allocated bit rate of the current I-frame.

In one embodiment, the current I-frame of the encoded video is obtained, and the bit-rate characteristic parameters associated with the current I-frame is obtained. The bit-rate characteristic parameters includes the number of video frames in the GOP in which the current I-frame is located, the pixel number of the current I-frame, and the proportion of the inter prediction macroblock in the historical P-frame before the current I-frame. Then, the maximum bit rate set of the current I-frame is separately obtained by using each bit-rate characteristic parameter, and finally the allocated bit rate of the current I-frame is generated according to the maximum bit rate set. The allocated bit rate of the I-frame is limited by using the number of video frames in the GOP, an image resolution, and a video characteristic, to more precisely allocate the bit rate to the I-frame, ensuring video file quality. The value of the bit rate allocated to the current I-frame is limited by properly adjusting the value of the GOP parameter, so that the bit rate peak generated due to the excessively high I-frame bit rate during the real-time communication is reduced. In the different video scenarios, the impact that the excessively low bit rate of the current I-frame has on the video file quality is reduced due to the effect of the coordinated adjustment of the pixel average bit rate and the image adjustment factor.

A person skilled in this field can understand that, all or some procedures in the methods in the foregoing embodiments may be implemented by a program instructing related hardware. The program may be stored in a computer readable storage medium. When being executed, the program may include the procedures according to the embodiments of the foregoing methods. The storage medium may be a magnetic disk, an optical disc, a read-only memory (ROM), a random-access memory (RAM), or the like.

An embodiment of the present invention provides a non-volatile computer readable storage medium, configured to store a machine-readable instruction, where the machine-readable instruction is executed to perform the foregoing methods.

Disclosed above are merely exemplary embodiments of the present disclosure, and are certainly not intended to limit the patent scope of the present disclosure. Therefore, an equivalent change made according to the claims of the present disclosure still falls within the scope of the present disclosure.

What is claimed is:

1. A bit rate allocation method, comprising:
    obtaining, by a computing device having an encoding function, an intra prediction frame (I-frame) of a to-be-encoded video;
    extracting, by a processor of the computing device, bit-rate characteristic parameters associated with the I-frame from the to-be-encoded video, the bit-rate characteristic parameters including a number of video frames in a group-of-picture (GOP) in which the I-frame is located, a pixel number of the I-frame, and a proportion of an inter prediction macroblock in a historical inter prediction frame (P-frame) before the I-frame;
    determining, by the computing device, an allocated bit rate of the I-frame according to each of the extracted bit-rate characteristic parameters based on a predetermined bit rate control scheme; and encoding, by the computing device, the I-frame of the video based on the allocated bit rate of the I-frame, wherein precise allocation of the bit rate to the I-frame ensures file quality of the video when being used in video compression or transmission scenarios.

2. The method according to claim 1, wherein the determining an allocated bit rate of the I-frame according to each bit-rate characteristic parameter comprises:

separately obtaining a maximum bit rate set of the I-frame by using each bit-rate characteristic parameter; and generating the allocated bit rate of the I-frame according to the maximum bit rate set.

3. The method according to claim 2, wherein the separately obtaining a maximum bit rate set of the I-frame by using each bit-rate characteristic parameters comprises:

obtaining a first maximum bit rate of the I-frame by using the number of video frames in the GOP in which the I-frame is located;

obtaining a second maximum bit rate of the I-frame by using the pixel number of the I-frame;

obtaining a third maximum bit rate of the I-frame by using the proportion of the inter prediction macroblock in the historical P-frame; and generating the maximum bit rate set according to the first maximum bit rate, the second maximum bit rate, and the third maximum bit rate.

4. The method according to claim 3, wherein the obtaining a first maximum bit rate of the I-frame by using the number of video frames in the GOP in which the I-frame is located comprises:

obtaining a target bit rate allocated to the GOP, and calculating an average target bit rate of the GOP by using the target bit rate and the number of video frames;

calculating the first maximum bit rate of the I-frame by using a first GOP parameter and the average target bit rate when the number of video frames is less than or equal to a preset number; and calculating the first maximum bit rate of the I-frame by using a second GOP parameter and the average target bit rate when the number of video frames is greater than the preset number, wherein the first GOP parameter is less than the second GOP parameter.

5. The method according to claim 3, wherein the obtaining a second maximum bit rate of the I-frame by using the pixel number of the I-frame comprises:

obtaining a video scenario corresponding to the to-be-encoded video, obtaining a pixel average bit rate corresponding to the video scenario, and obtaining an image adjustment factor corresponding to an image size of the I-frame; and calculating the second maximum bit rate of the I-frame by using the pixel average bit rate, the image adjustment factor, and the pixel quantity.

6. The method according to claim 3, wherein the obtaining a third maximum bit rate of the I-frame by using the proportion of the inter prediction macroblock in the historical P-frame comprises:

obtaining a target bit rate allocated to the GOP, and calculating an average target bit rate of the GOP by using the target bit rate and the number of video frames;

obtaining a ratio range of the proportion of the inter prediction macroblock in the historical P-frame, and obtaining a bit rate adjustment parameter corresponding to the ratio range; and calculating the third maximum bit rate of the I-frame by using the bit rate adjustment parameter and the average target bit rate.

7. The method according to claim 3, wherein the generating the allocated bit rate of the I-frame according to the maximum bit rate set comprises:

calculating a reference bit rate of the I-frame by using a preset bit rate control algorithm; and using a larger bit rate of the first maximum bit rate and the second maximum bit rate as a first allocated bit rate, using a smaller bit rate of the first allocated bit rate and the reference bit rate as a second allocated bit rate, and using a smaller bit rate of the second allocated bit rate and the third maximum bit rate as the allocated bit rate of the I-frame.

8. The method according to claim 3, wherein the generating the allocated bit rate of the I-frame according to the maximum bit rate set comprises:

calculating a reference bit rate of the I-frame by using a preset bit rate control algorithm; and calculating a weighted bit rate by using the first maximum bit rate, the second maximum bit rate, and a weighting parameter when the first maximum bit rate is less than the second maximum bit rate, and using a smaller bit rate of the weighted bit rate and the reference bit rate as a third allocated bit rate;

using a smaller bit rate of the first maximum bit rate and the reference bit rate as the third allocated bit rate when the first maximum bit rate is greater than or equal to the second maximum bit rate; and using a smaller bit rate of the third allocated bit rate and the third maximum bit rate as the allocated bit rate of the I-frame.

9. A non-transitory computer-readable storage medium storing computer program instructions executable by at least one processor of a computing device having an encoding function to perform:

obtaining an intra prediction frame (I-frame) of a to-be-encoded video;

extracting bit-rate characteristic parameters associated with the I-frame from the to-be-encoded video, the bit-rate characteristic parameters including a number of video frames in a group-of-picture (GOP) in which the I-frame is located, a pixel number of the I-frame, and a proportion of an inter prediction macroblock in a historical inter prediction frame (P-frame) before the I-frame; and determining an allocated bit rate of the I-frame according to each of the extracted bit-rate characteristic parameters based on a predetermined bit rate control scheme; and encoding the I-frame of the video based on the allocated bit rate of the I-frame, wherein precise allocation of the bit rate to the I-frame ensures file quality of the video when being used in video compression or transmission scenarios.

10. The non-transitory computer-readable storage medium according to claim 9, wherein the determining an allocated bit rate of the I-frame according to each bit-rate characteristic parameter comprises:

separately obtaining a maximum bit rate set of the I-frame by using each bit-rate characteristic parameter; and generating the allocated bit rate of the I-frame according to the maximum bit rate set.

11. The non-transitory computer-readable storage medium according to claim 10, wherein the separately obtaining a maximum bit rate set of the I-frame by using each bit-rate characteristic parameters comprises:

obtaining a first maximum bit rate of the I-frame by using the number of video frames in the GOP in which the I-frame is located;
    obtaining a second maximum bit rate of the I-frame by using the pixel number of the I-frame;
    obtaining a third maximum bit rate of the I-frame by using the proportion of the inter prediction macroblock in the historical P-frame; and
    generating the maximum bit rate set according to the first maximum bit rate, the second maximum bit rate, and the third maximum bit rate.

12. The non-transitory computer-readable storage medium according to claim 11, wherein the obtaining a first maximum bit rate of the I-frame by using the number of video frames in the GOP in which the I-frame is located comprises:

obtaining a target bit rate allocated to the GOP, and calculating an average target bit rate of the GOP by using the target bit rate and the number of video frames;
    calculating the first maximum bit rate of the I-frame by using a first GOP parameter and the average target bit rate when the number of video frames is less than or equal to a preset number; and
    calculating the first maximum bit rate of the I-frame by using a second GOP parameter and the average target bit rate when the number of video frames is greater than the preset number,
    wherein the first GOP parameter is less than the second GOP parameter.

13. The non-transitory computer-readable storage medium according to claim 11, wherein the obtaining a second maximum bit rate of the I-frame by using the pixel number of the I-frame comprises:

obtaining a video scenario corresponding to the to-be-encoded video, obtaining a pixel average bit rate corresponding to the video scenario, and obtaining an image adjustment factor corresponding to an image size of the I-frame; and
    calculating the second maximum bit rate of the I-frame by using the pixel average bit rate, the image adjustment factor, and the pixel quantity.

14. The non-transitory computer-readable storage medium according to claim 11, wherein the obtaining a third maximum bit rate of the I-frame by using the proportion of the inter prediction macroblock in the historical P-frame comprises:

obtaining a target bit rate allocated to the GOP, and calculating an average target bit rate of the GOP by using the target bit rate and the number of video frames;
    obtaining a ratio range of the proportion of the inter prediction macroblock in the historical P-frame, and obtaining a bit rate adjustment parameter corresponding to the ratio range; and
    calculating the third maximum bit rate of the I-frame by using the bit rate adjustment parameter and the average target bit rate.

15. The non-transitory computer-readable storage medium according to claim 11, wherein the generating the allocated bit rate of the I-frame according to the maximum bit rate set comprises:

calculating a reference bit rate of the I-frame by using a preset bit rate control algorithm; and
    using a larger bit rate of the first maximum bit rate and the second maximum bit rate as a first allocated bit rate, using a smaller bit rate of the first allocated bit rate and the reference bit rate as a second allocated bit rate, and using a smaller bit rate of the second allocated bit rate and the third maximum bit rate as the allocated bit rate of the I-frame.

16. The non-transitory computer-readable storage medium according to claim 11, wherein the generating the allocated bit rate of the I-frame according to the maximum bit rate set comprises:

calculating a reference bit rate of the I-frame by using a preset bit rate control algorithm; and
    calculating a weighted bit rate by using the first maximum bit rate, the second maximum bit rate, and a weighting parameter when the first maximum bit rate is less than the second maximum bit rate, and using a smaller bit rate of the weighted bit rate and the reference bit rate as a third allocated bit rate;
    using a smaller bit rate of the first maximum bit rate and the reference bit rate as the third allocated bit rate when the first maximum bit rate is greater than or equal to the second maximum bit rate; and
    using a smaller bit rate of the third allocated bit rate and the third maximum bit rate as the allocated bit rate of the I-frame.

17. A bit rate allocation device, comprising:
    a non-volatile memory storing machine-readable instructions; and
    a processor coupled to the non-volatile memory and, when executing the machine-readable instructions, configured for:
    obtaining an intra prediction frame (I-frame) of a to-be-encoded video;
    extracting a bit-rate characteristic parameters associated with the I-frame from the to-be-encoded video, the bit-rate characteristic parameters including a number of video frames in a group-of-picture (GOP) in which the I-frame is located, a pixel number of the I-frame, and a proportion of an inter prediction macroblock in a historical inter prediction frame (P-frame) before the I-frame;
    determining an allocated bit rate of the I-frame according to each of the extracted bit-rate characteristic parameters based on a predetermined bit rate control scheme; and
    encoding the I-frame of the video based on the allocated bit rate of the I-frame, wherein precise allocation of the bit rate to the I-frame ensures file quality of the video when being used in video compression or transmission scenarios.

18. The bit rate allocation device according to claim 17, wherein the determining an allocated bit rate of the I-frame according to each bit-rate characteristic parameter comprises:

separately obtaining a maximum bit rate set of the I-frame by using each bit-rate characteristic parameter; and
    generating the allocated bit rate of the I-frame according to the maximum bit rate set.

19. The bit rate allocation device according to claim 18, wherein the separately obtaining a maximum bit rate set of the I-frame by using each bit-rate characteristic parameters comprises:

obtaining a first maximum bit rate of the I-frame by using the number of video frames in the GOP in which the I-frame is located;
    obtaining a second maximum bit rate of the I-frame by using the pixel number of the I-frame;

obtaining a third maximum bit rate of the I-frame by using the proportion of the inter prediction macroblock in the historical P-frame; and generating the maximum bit rate set according to the first maximum bit rate, the second maximum bit rate, and the third maximum bit rate.

* * * * *